US012307856B1

(12) United States Patent
Altizer et al.

(10) Patent No.: US 12,307,856 B1
(45) Date of Patent: May 20, 2025

(54) SYSTEMS AND METHODS TO MONITOR POTENTIAL MONEY LAUNDERING ACTIVITY THROUGH REGULATING GAMING MACHINES

(71) Applicant: ALTIWOOD LLC, Hermosa Beach, CA (US)

(72) Inventors: Brian Isaac Altizer, Las Vegas, NV (US); Christopher John Woodward, Hermosa Beach, CA (US)

(73) Assignee: Altiwood LLC, Hermosa Beach, CA (US)

( * ) Notice: Subject to any disclaimer, the term of this patent is extended or adjusted under 35 U.S.C. 154(b) by 0 days.

(21) Appl. No.: 18/821,967

(22) Filed: Aug. 30, 2024

(51) Int. Cl.
*G07F 17/32* (2006.01)

(52) U.S. Cl.
CPC ...... *G07F 17/3241* (2013.01); *G07F 17/3232* (2013.01); *G07F 17/3246* (2013.01)

(58) Field of Classification Search
CPC ........................................................ G07F 17/32
See application file for complete search history.

(56) References Cited

U.S. PATENT DOCUMENTS 8,506,377 B2 8/2013 Heatherly
8,597,116 B2 12/2013 Nguyen
9,384,629 B2 7/2016 Chun
9,734,663 B2 8/2017 Chun
10,762,744 B2 9/2020 Chun
11,790,725 B2 10/2023 Nguyen
2005/0137016 A1* 6/2005 Enzminger ............. G07F 17/32 463/42
2015/0279155 A1* 10/2015 Chun ................. G06Q 20/4016 463/25
2017/0309121 A1* 10/2017 Chun ................. G06Q 20/1085
2022/0036362 A1* 2/2022 Warren, Jr. ......... G07F 17/3241
2023/0186722 A1* 6/2023 Warren, Jr. ......... G07F 17/3239 463/29

* cited by examiner

*Primary Examiner* — Omkar A Deodhar
(74) *Attorney, Agent, or Firm* — Esplin & Associates, PC

(57) ABSTRACT

Systems and methods to monitor potential money laundering activity through regulating gaming machines are disclosed. Exemplary implementations may: obtain, from electronic storage, parameter values for (i) consideration input parameters, (ii) play parameters, and (iii) consideration extraction parameters for a first play session; determine, from the parameter values, a first session risk score which quantifies a likelihood that redemption of a first consideration output balance without subsequent gaming using the first consideration output balance is money laundering; receive a redemption request to redeem the first consideration output balance; and responsive to receipt of the redemption request with a first identifier, and the first session risk score indicating the likelihood that redemption of the first consideration output balance without subsequent gaming using the first consideration output balance is money laundering breaching a threshold, effectuate a notification of the first session risk score to an electronic device of an administrative user.

20 Claims, 5 Drawing Sheets

SYSTEMS AND METHODS TO MONITOR POTENTIAL MONEY LAUNDERING ACTIVITY THROUGH REGULATING GAMING MACHINES

FIELD OF THE DISCLOSURE

Detection of money laundering amongst gaming machines and notifications of likelihoods of the money laundering.

BACKGROUND

Casinos and card clubs are vulnerable to money laundering and other financial crimes. This may be due, in part, to the fact that gaming institutions are typically fast-paced, cash-intensive businesses that often provide a broad array of financial products and services, some of which are similar to those provided by depository institutions and money services businesses. Additionally, users wishing to engage in anonymous money laundering activities may advantageously exploit the fact that gaming institutions typically serve a diverse and transient customer base.

SUMMARY

One aspect of the present disclosure relates to a system configured to monitor potential money laundering activity through regulating gaming machines. The system may include electronic storage, one or more hardware processors configured by machine-readable instructions, and/or other components.

The electronic storage may store for individual play sessions on a first gaming machine, parameter values for (i) consideration input parameters, (ii) play parameters, (iii) consideration extraction parameters, and/or other parameters.

The consideration input parameters for a given play session may include consideration amount input during the given play session, currency denominations input as consideration during the given play session, and/or other consideration input parameters.

The play parameters for the given play session may include one or more of a number of game events played during the given play session, an amount of times consideration is added during the given play session, an amount of consideration wagered for individual ones of the game events during the given play session, a total amount of consideration wagered over the individual play sessions, a comparison or proportion of a total amount of consideration wagered with a total amount of consideration input during the given play session, an amount of time between the game events during the given play session, a duration of the given play session, and/or other play parameters.

The consideration extraction parameters for the given play session include a consideration output balance obtained by a user subsequent to the given play session, an identifier, and/or other consideration extraction parameters. The play sessions may include a first play session and/or other play sessions.

The machine-readable instructions may include one or more instruction components. The instruction components may include computer program components. The instruction components may include one or more of information obtaining component, score determining component, redemption receiving component, notifying component, and/or other instruction components.

The information obtaining component may be configured to obtain, from the electronic storage, the parameter values for (i) the consideration input parameters, (ii) the play parameters, and (iii) the consideration extraction parameters for the first play session. The consideration extraction parameters for the first play session include a first consideration output balance, and a first identifier.

The score determining component may be configured to determine, from the parameter values for the first play session, a first session risk score which quantifies a likelihood that redemption of the first consideration output balance without subsequent gaming using the first consideration output balance is money laundering.

The redemption receiving component may be configured to receive a redemption request to redeem the first consideration output balance. The redemption request may include the first identifier.

The notifying component may be configured to responsive to receipt of the redemption request, further responsive to the presence of the first identifier redemption request, and still further responsive to the first session risk score indicating the likelihood that redemption of the first consideration output balance without subsequent gaming using the first consideration output balance is money laundering breaching a threshold of likelihood, effectuate a notification of the first session risk score to an electronic device of an administrative user.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
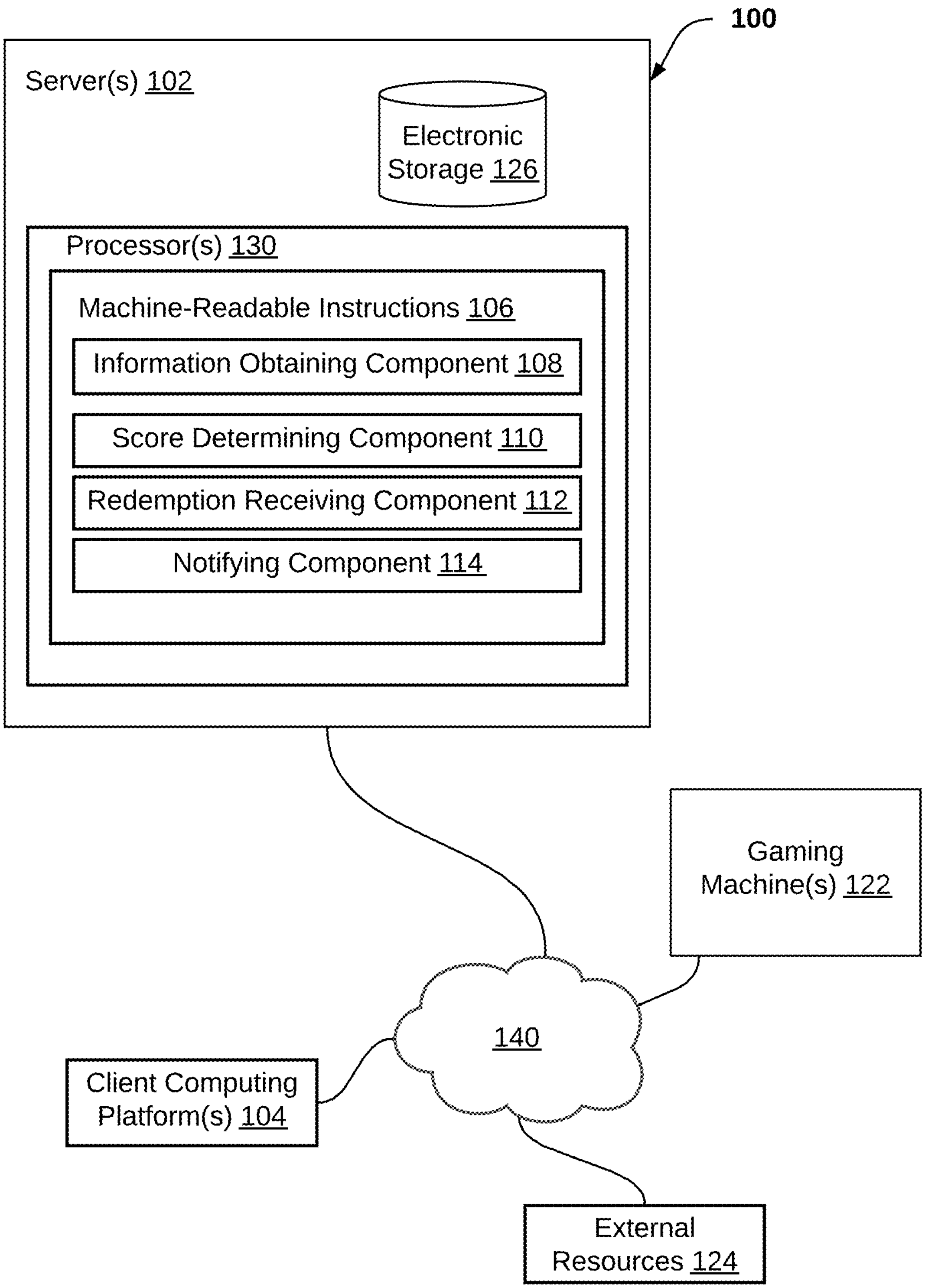
FIG. 1A-B illustrates a system configured to monitor potential money laundering activity through regulating gaming machines, in accordance with one or more implementations.

FIG. 1A illustrates a system 100 configured to monitor potential money laundering activity through regulating gaming machines, in accordance with one or more implementations. In some implementations, system 100 may include one or more server(s) 102, gaming machine(s) 122, client computing platform(s) 104, external resources 124, and/or other elements. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include electronic storage 126 and be configured by machine-readable instructions 106. Machine-readable instructions 106 may include one or more instruction components. The instruction components may include computer program components. The instruction components may include one or more of information obtaining component 108, score determining component 110, redemption receiving component 112, notifying component 114, and/or other instruction components.

Electronic storage 126 may store for individual play sessions on gaming machines 122, parameter values for (i) consideration input parameters, (ii) play parameters, (iii) consideration extraction parameters, other parameters, and/or other information. Gaming machines 122 may include a first gaming machine 122, a second gaming machine 122, and/or other gaming machines. The play sessions may include a first play session, a second play session, and/or other play sessions. By way of non-limiting example, the first play session may be executed on first gaming machine 122 and the second play session may be executed on second gaming machine 122.

The consideration input parameters for a given play session may include consideration amount input during the given play session, consideration items input during the given play session, and/or other consideration input parameters.

The consideration items input may be individual items of consideration that are input to gaming machines 122 to establish or add to a given consideration balance. The given consideration balance or part thereof may be wagered during one or more game events played on gaming machines 122 during the given play session. The consideration items input may include currency denominations that are input as the consideration during the given play session, identifiers that are input as the consideration during the given play session, and/or other consideration items.

The currency denominations may include minted and physical US dollar (USD) bills (e.g., 10 USD, 50 USD), Euros, Yen, among other physical currency denominations that are associated with a consideration amount. In some implementations, the currency denominations may not be limited to physically printed/minted currency but may include debit cards pre-loaded with a predefined amount of currency, currency from automated teller machine (ATM) cards, currency from credit cards, virtual currency via electronic devices and/or directly from virtual sources, cryptocurrency via the electronic devices and/or directly from the virtual sources, and/or other physical and virtual forms of currency. The virtual currency and/or the cryptocurrency may be sourced from virtual ATM cards, virtual credit cards, one or more bank accounts, one or more balance accounts (e.g., PayPal, Venmo), one or more cryptocurrency exchange accounts, and/or other virtual sources via the electronic devices. In some implementations, virtual currency and/or the cryptocurrency may be sourced from the virtual sources directly via gaming machines 122 such that the user may log into the one or more bank accounts, log into one or more balance accounts, log into one or more cryptocurrency exchange accounts, input debit card numbers, input credit card numbers, and/or other direct sourcing via gaming machines 122 authorized by the user. The electronic devices may include, but are not limited to, a mobile smart phone, a smart watch, other smart wearable accessories, and/or other electronic devices. The currency denominations that are virtual may be input into the gaming machines 122 via the electronic devices and/or optical scanners and readers and/or other electronic readers. The optical scanners and readers may include a card reader, near-field communication (NFC) reader, barcode reader, quick-response (QR) code reader, short range wireless communication technology (e.g., Bluetooth), Wi-Fi, other optical scanners, and/or other electronic readers. By way of non-limiting example, the user may hold up their smart phone to gaming machines 122 to enable input of the virtual currency. As another example, the currency denominations may include a 30 USD pre-loaded debit card, and virtual pre-loaded debit cards.

The identifiers that are input as the consideration during the given play session may be similar to the currency denominations as the identifiers are associated with some consideration amount, though such consideration amount may be arbitrary and not minted currency. The identifier may include a serial code, a QR code, a bar code, an electronic device (e.g., NFC chip, a radio-frequency identification (RFID) object), and/or other identifier that gaming machines 122 may recognize via the optical scanners and/or the electronic readers. In some implementations, the identifiers may be printed on physical items such as a piece of paper. Thus, the consideration amount input during the given play session may be a total amount of the consideration that a user has input, for example, into first gaming machine 122 as the consideration items.

The play parameters for the given play session may include one or more of a number of the game events played during the given play session, an amount of times consideration is added during the given play session, an amount of consideration wagered for individual ones of the game events during the given play session, a total amount of consideration wagered over the individual play sessions, a comparison or proportion of a total amount of consideration wagered with a total amount of consideration input during the given play session, an amount of time between the game events during the given play session, a duration of the given play session, and/or other play parameters.

The game events may be instances of a game initiated and played by individual users during the given play session on gaming machines 122. Individual gaming machines 122 may execute instances of a single game or instances of multiple different games. By way of non-limiting example, first gaming machine 122 may be a virtual horse racing game. A first game event may be a first virtual horse racing game that the user initiated and played during a first play session on first gaming machine 122. Subsequently, the user may initiate and play a second virtual horse racing game during first play session on first gaming machine 122. Thus, the number of game events played during the first play session may be two.

During the given play session, the user may input additional consideration items to increase the given consideration balance one or more times. By way of non-limiting example, the parameter values for the play parameters may define that 20 USD was input prior to the first game event and another 20 USD was input prior to the second game event.

During individual ones of the game events, an amount of the consideration from the consideration balance may be wagered. The amount of consideration wagered may be the same or different for the individual game events. For example, the parameter values for the play parameters may define that 5 USD were wagered for the first game event and 10 USD were wagered for the second game event.

The total amount of consideration wagered over the individual play sessions may define a sum of the consideration wagered for all the game events over the given play session. For example, the parameter values for the play parameters may define that 15 USD was wagered during the first play session when the first game event and the second game event were played.

The comparison or proportion of the total amount of consideration wagered with the total amount of consideration input during the given play session may indicate how much consideration was actually wagered with regard to how much consideration was input into first gaming machine 122, for example. The comparison or proportion may be a percentage, a fraction, or other comparison representation form.

The user may play the game events immediately after one another, or time may transpire between the game events. Thus, for example, the parameter values for the play parameters may define that 75 seconds transpired between the first game event and the second game event during the first play session. The duration of the given play session may be an amount of time between when the user initially input consideration items and termination of the given play session.

The consideration extraction parameters for the given play session include a consideration output balance obtained by the user subsequent to the given play session, the identifier (described herein), and/or other consideration extraction parameters. The consideration output balance may be an amount of the consideration that the user receives after termination of the given play session and thus has an option to redeem for currency, play in subsequent play sessions, or otherwise keep for themselves to spend, play, gift at any given time. The identifier may correspond to the consideration output balance so that upon the identifier being input into other gaming machines 122 or included in a redemption request, the corresponding consideration output balance is determined and applied.

Information obtaining component 108 may be configured to obtain, from electronic storage 126, the parameter values for (i) the consideration input parameters, (ii) the play parameters, (iii) the consideration extraction parameters, and/or other parameters for the individual play sessions. The parameter values for the individual play sessions may be determined upon the initiation, during, and upon the termination of the play sessions. By way of non-limiting example, the parameter values for the first play session may be determined upon the initiation of the first play session, during the first play session, and upon termination of the first play session. The consideration extraction parameters for the first play session may include a first consideration output balance and a first identifier.

Score determining component 110 may be configured to determine, from the parameter values for the individual play sessions, session risk scores. A session risk score may quantify a likelihood that redemption of the consideration output balance without subsequent gaming using the consideration output balance is money laundering. Redemption of the consideration output balance may refer to receiving an amount of one or more currencies that collectively represents the corresponding consideration output balance in exchange for the corresponding identifier. In some implementations, the one or more currencies received by the user may be received electronically. For example, the user may receive a virtual cash card, a deposit into an online bank account, a deposit to a bank account associated with an ATM card, a balance credit to a credit card, a deposit of cryptocurrency to a cryptocurrency exchange account, and/or other electronic form.

By way of non-limiting example, a first session risk score may be determined from the parameter values for the first play session. The first session risk score may quantify a likelihood that redemption of the first consideration output balance without subsequent gaming using the first consideration output balance is money laundering. That is, upon the user forgoing further gaming with the first consideration output balance via gaming machines 122 and proceeding to redeem the first consideration output balance, the first session risk score may quantify a likelihood that the redemption of the consideration output balance is money laundering. In some implementations, the determined session risk scores may be associated with the identifiers, the consideration output balances, the play sessions, and/or other information related to the play sessions and stored to electronic storage 126. By way of non-limiting example, the determined first session risk score may be associated with the first identifier, the first consideration output balance, the first play session, and/or other information related to the first play session and stored to electronic storage 126.

Individual session risk scores may be a numerical value between a predefined range, a letter score, a percentage, a proportion, and/or other score form. In some implementations, determination of the session risk scores may include employing one or more models. In some implementations, a model may comprise of a one or more of a machine learning model, a probabilistic model, a decision tree model, and/or other models. In some implementations, different models may be utilized at different stages of the system 100.

In some implementations, a model may utilize one or more of an artificial neural network, k-means clustering algorithm, linear regression, logistic regression, nearest neighbors, matrix factorization (e.g., a class of a class of collaborative filtering algorithms), a classifier, a histogram, and/or other approaches. Training a model may utilize one or more of deep learning, supervised learning, semi-supervised learning, unsupervised learning, reinforcement learning, low-code techniques, and/or other techniques.

In supervised learning, the model may be provided with a known training dataset that includes desired inputs (e.g., training input information) and outputs (e.g., training output information), and the model may be configured to find a method to determine how to arrive at those outputs based on the inputs. The model may identify patterns in information, learn from observations, and/or make predictions. The model may make predictions and may be corrected by an operator—this process may continue until the model achieves a desired level of accuracy/performance. Supervised learning may utilize approaches including one or more of classification, regression, forecasting, and/or other approaches.

Semi-supervised learning may be similar to supervised learning, but instead uses both labelled and unlabeled training information. Labelled data may comprise information that has meaningful tags so that the model can understand the information, while unlabeled information may lack those specific tags. By using this combination, the machine learning model may learn to label unlabeled data.

For unsupervised learning, the machine learning model may study training information to identify patterns. There may be no answer key or human operator to provide instruction. Instead, the model may determine the correlations and relationships by analyzing training information. In an unsupervised learning process, the machine learning model may be left to interpret large information sets and address the training information accordingly. The model may try to organize training information in some way to describe its structure. This might mean grouping training information into clusters or arranging it in a way that looks more organized. Unsupervised learning may use techniques such as clustering and/or dimension reduction.

Machine learning models may operate by generating inferences, e.g., conclusions drawn about unseen or unmentioned information from learned knowledge. Generating inferences may refer to a process of making predictions, deductions, and/or conclusions based on patterns and/or relationships learned by a model. Inferences are a powerful aspect of machine learning, enabling models to reason, make connections, and/or provide insightful responses.

The process of generating inferences may involve using patterns and/or relationships learned from large amounts of information. Inference generating processes may rely on a model's ability to store information about concepts and/or relationships in its internal representations (e.g., knowledge encoding), identify similarities and/or connections between pieces of text, concepts, and/or entities (e.g., pattern recognition), apply learned patterns and/or relationships to new, unseen situations (e.g., generalize), and/or draw logical conclusions from encoded knowledge and/or recognized patterns (e.g., reason). In some implementations, inferences may be one or more of explicit, implicit, abductive, and/or deductive. Explicit inferences may be direct conclusions that may include specific pieces of information. Implicit inferences may be suggested and/or implied conclusions. Abductive inferences may be educated guesses or hypotheses based on incomplete information. Deductive inferences may be conclusions drawn with certainty, using logical rules and evidence.

In some implementations, information obtaining component 108 and/or other instruction components may be configured to organize the information determined from the play sessions and confirmed money laundering outcomes into input/output training information pairs used to train a model.

Training may be accomplished by providing that information during a training (or retraining or adapting) phase of that model. An individual input/output training information pair may include individual input training information, individual output training information, and/or other information. The individual input training information may include the parameter values for the individual play sessions, session risk scores, preliminary risk scores, and/or other information. The individual output training information may include the confirmed money laundering outcomes. In some implementations, the parameter values for the individual play sessions may be organized into the input training information and the session risk scores, preliminary risk scores, and the confirmed money laundering outcomes may be organized into the output training information. The confirmed money laundering outcomes may include financial information that indicates a financial loss or error.

The information obtaining component 108 may be configured to provide sets of input/output training information pairs to a model to train, retrain, fine-tune, adapt, and/or otherwise prepare the model for use. By virtue of current technology surrounding machine learning, the act of providing the input/output training information pairs to a model may cause the model to be trained to thereby generate a trained model. The trained model may be trained to generate certain output, in particular, session risk scores, preliminary risk scores, a likelihood threshold for the session risk scores, a likelihood threshold for the preliminary risk scores, and/or other output.

One or more of models used by system 100 may be continually refined as time goes on. By way of non-limiting illustration, the likelihood threshold for the session risk scores and the likelihood threshold for the preliminary risk scores, and/or other information described herein may be continuously updated as users interact with gaming machines 122 within a particular environment (e.g., casino), gaming machines 122 owned by a particular group (e.g., casino/hotel group), gaming machines 122 manufactured and/or programed by the same manufacturer and/or software, which is then input back into a model to further refine and/or retrain it. Other triggers to collect information for retraining may be considered.

Redemption receiving component 112 may be configured to receive individual redemption requests to redeem individual consideration output balances resultant from the individual play sessions. The individual redemption requests may include the individual identifiers signifying that the individual consideration output balances are to be redeemed. In some implementations, the individual redemption requests may include the individual consideration output balances, the session risk scores determined based on the individual identifiers that the individual consideration output balances correspond to, the parameter values for the play sessions, and/or other information.

By way of non-limiting example, a first redemption request to redeem the first consideration output balance may be received. The first redemption request may include the first identifier signifying that the first consideration output balance is to be redeemed. In some implementations, the first redemption request may include the first consideration output balance, the first session risk score, the parameter values for the first play session, and/or other information.

In some implementations, the individual redemption requests may be transmitted to and fulfilled by a third party that may be communicated with by server(s) 102 via a network 140 upon redemption receiving component 112 receiving the redemption requests and enabling utilization of the redemption requests in effectuating notifications.

Notifying component 114 may be configured to (a) responsive to receipt of the individual redemption requests, (b) further responsive to the presence of the individual identifiers via the individual redemption request, and (c) still further responsive to the individual session risk scores for the individual play sessions indicating the likelihood that redemption of the individual consideration output balances without subsequent gaming using the consideration output balances is money laundering breaching a threshold of likelihood, effectuate a notification of the individual session risk scores to an electronic device of an administrative user.

In some implementations, the threshold of likelihood may be predefined and stored in electronic storage 126. In some implementations, the threshold of likelihood may be determined by employing novel and/or known models described herein based on the parameter values for the play sessions completed amongst gaming machines 122. That is, information obtaining component 108 may be configured to transmit the parameter values for the play sessions to the models stored in electronic storage 126 and/or transmit the parameter values for the play sessions to the models stored external to server(s) 102 via network 140. Based on output from the models, the threshold may be determined and/or adjusted appropriately as the parameter values are determined.

In some implementations, responsive to receipt of the individual redemption requests and responsive to the presence of the individual identifiers via the individual redemption request, notifying component 114 may obtain the individual session risk scores based on the individual identifiers. Furthermore, notifying component 114 may determine whether the individual session risk scores breach the threshold of likelihood that such previous play session(s) are money laundering.

EXAMPLE 1 By way of non-limiting example, responsive to receipt of the redemption request, further responsive to the presence of the first identifier redemption request, and still further responsive to the first session risk score indicating the likelihood that redemption of the first consideration output balance without subsequent gaming using the first consideration output balance is money laundering breaching the threshold of likelihood, a first notification of the first session risk score may be effectuated to the electronic device of the administrative user. The administrative user may be a manager of gaming machines 122, a manager of a host institution for gaming machines 122, and/or other administrative users.

In some implementations, the individual consideration output balances obtained by the users may be used for subsequent play sessions on the same or different gaming machines 122 by the corresponding identifiers being input into one of gaming machines 122 in addition to or alternative to the currency denominations. That is, the individual users may initiate multiple play sessions amongst one or more of the gaming machines 122 before initiating the redemption requests to redeem the consideration output balances.

By way of non-limiting example, the first identifier may be input as consideration to a second gaming machine 122, or other gaming machine 122. Thus, the first consideration output balance may be used as the consideration during the second play session subsequent to the first play session on first gaming machine 122. As such, a second consideration item input for the second play session may include the first identifier, and/or other consideration items. By way of non-limiting example, other consideration item input may include a second currency (e.g., a 100 USD).

Upon the initiation, duration of, and the termination of the second play session, the parameter values for (i) the consideration input parameters, (ii) the play parameters, (iii) the consideration extraction parameters, and/or other parameters for the second play session may be obtained from electronic storage 126 (by information obtaining component 108). Furthermore, the consideration extraction parameters for the second play session may include a second consideration output balance, and a second identifier, which are different from the first consideration output balance, and the first identifier, respectively.

Furthermore, a second session risk score which quantifies a likelihood that redemption of the second consideration output balance without subsequent gaming using the second consideration output balance is money laundering may be determined (by scoring determining component 110). The determination of the second session risk score may be further based on the parameter values for the first play session by virtue of the first identifier being included as the second consideration item input. Thus, an association between the first play session and the second play session may be implied and therefore considered at determination of the second session risk score.

Similar to the first redemption request, a second redemption request to redeem the second consideration output balance may be received (by redemption receiving component 112). The second redemption request may include the second identifier and/or other parameter values for the consideration extraction parameters for the second play session.

Lastly, a notification of the second session risk score to the electronic device of the administrative user may be effectuated (by notifying component 114) responsive to (a) receipt of the redemption request, (b) further responsive to the presence of the second identifier via the second redemption request, and (c) still further responsive to the second session risk score indicating the likelihood that redemption of the second consideration output balance without subsequent gaming using the second consideration output balance is money laundering breaching the threshold of likelihood.

Figure 1B:
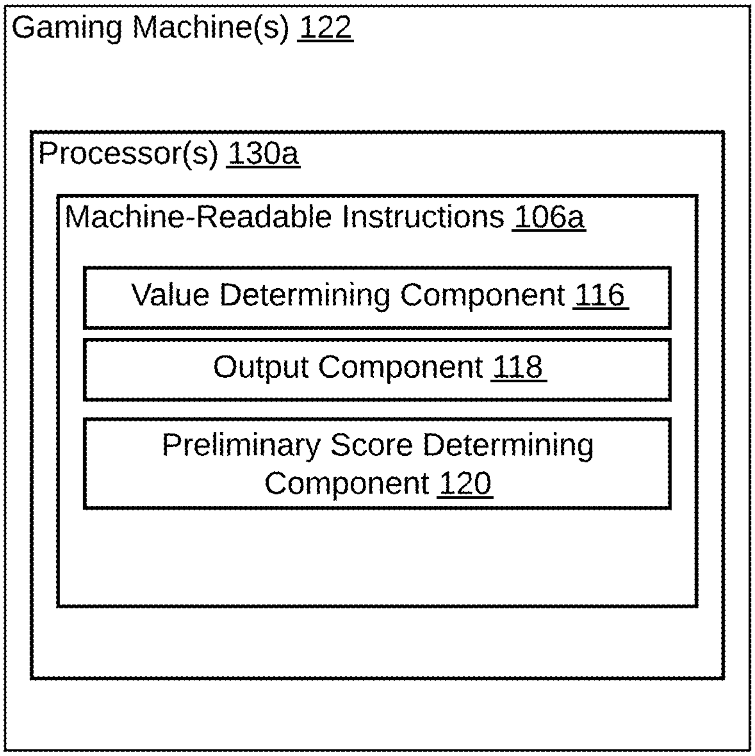

Referring to FIG. 1B, gaming machines 122 may include processors 130*a* configured by machine-readable instructions 106*a*. Machine-readable instructions 106*a* may include one or more instruction components. The instruction components may include computer program components. The instruction components may include one or more of value determining component 116, output component 118, preliminary score determining component 120, and/or other instruction components.

Value determining component 116 may be configured to determine the parameter values for the consideration input parameters upon the individual gaming machines receiving at least a single consideration item. Gaming machines 122 may be configured to analyze and determine the consideration items input and define the currency denominations input and/or the identifiers input to initiate the first play session and establish the consideration balance. Gaming machines 122 may include the optical readers, bill validators, and/or other consideration readers. By way of non-limiting example, upon first gaming machine 122 receiving at least a first piece of currency, the parameter values for the consideration input parameters may be determined. That is, a first currency denomination input to first gaming machines 122 may include a 5 USD.

Furthermore, value determining component 116 may be configured to determine the parameter values for the play parameters upon execution of the one or more game events on the individual gaming machines during the individual play sessions. By way of non-limiting example, the parameter values for the play parameters upon execution of the one or more game events on first gaming machine 122 during the first play session may be determined.

Moreover, value determining component 116 may be configured to determine the parameter values for the consideration extraction parameters upon individual gaming machines 122 receiving an indication to terminate the individual play sessions. By way of non-limiting example, the parameter values for the consideration extraction parameters may be determined upon first gaming machine 122 receiving an indication to terminate the first play session via first gaming machine 122. Similarly, the parameter values for the second play session may be determined by value determining component 116 of second gaming machine 122.

The indication to terminate the individual play sessions may include the user selecting one or more virtual user interface elements, one or more physical user interface elements (e.g., button on gaming machines 122), a particular amount of time transpiring subsequent to a game event, and/or other indications to terminate the individual play sessions. The indications to terminate may be received via user interface elements of gaming machines 122. Virtual and physical user interface elements may be configured to be selected by the users to cause wagers during the game events, initiate individual ones of the game events to play during the individual play sessions, participate the individual game events, terminate the individual game events, terminate the individual play sessions, and/or other actions. The user interface elements may be configured to facilitate user interaction with the user interface, user entry, and/or selection. By way of non-limiting example, the user interface elements may include one or more of text input fields, drop down menus, check boxes, display windows, virtual buttons, and/or other user interface elements. In some implementations, the user may select one of the virtual user interface elements or the physical user interface elements to terminate the individual play sessions and subsequently be prompted to confirm the indication to terminate with an additional selection one of the virtual user interface elements or the physical user interface elements.

In some implementations, preliminary score determining component 120 may be configured to determine preliminary risk scores based on the parameter values for the individual play sessions. The individual preliminary risk scores determined may quantify a likelihood that the individual play sessions are participating in the money laundering. That is, the individual play sessions initiated and completed by the user may be participating in the money laundering, though the redemption requests have not yet been initiated by the user and received by redemption receiving component 112. The individual preliminary risk scores may be determined in response to individual gaming machines 122 receiving the indication to terminate the play sessions they are individually executing and terminating the play sessions. In some implementations, determination of the preliminary risk scores may include employing the one or more models as described herein.

By way of non-limiting example, preliminary score determining component 120 of first gaming machine 122 may be configured to determine a first preliminary risk score based on the parameter values for the first play session in response to the first gaming machine 122 receiving the indication to terminate the first play session and terminating the first play session. Furthermore, preliminary score determining component 120 of second gaming machine 122 may be configured to determine a second preliminary risk score for the second play session based on the parameter values for the second play session and the first preliminary risk score in response to the second gaming machine 122 receiving the indication to terminate the second play session and terminating the second play session. In some implementations, preliminary score determining component 120 may be configured to effectuate a preliminary notification of the preliminary risk scores to the electronic device of the administrative user.

In some implementations, the preliminary risk scores may be determined and/or notified to the administrative user by one or more of the instruction components of server(s) 102, such as score determining component 110.

In some implementations, the determination of the first session risk score may be based on the first preliminary risk score. In some implementations, the determination of the second session risk score being based on the parameter values for the first play session and the parameter values for the second play session may be that the determination of the second session risk score is based on the first preliminary risk score, the second preliminary risk score, and/or other information.

Output component 118 may be configured to output the identifiers and representations of the output consideration balances in response to receiving the indication to terminate the individual play sessions and terminating the individual play sessions. By way of non-limiting example, the first identifier and a representation of the first output consideration balance may be output in response to receiving the indication to terminate the first play session and terminating the first play session.

Outputting may include printing the identifiers and the representations of the output consideration balances in text on a physical item (e.g., paper ticket, play chip), uploading the identifiers and the output consideration balances on a portable electronic device (e.g., via an RFID on an object such as a card, a universal-serial bus), crediting the ATM card, crediting the credit card, updating a device with NFC, depositing to the one or more bank accounts, depositing to the one or more cryptocurrency exchange accounts, depositing to the one or more balance accounts, and/or other outputs so that the users may obtain the individual identifiers and the output consideration balances to redeem or subsequently input as the consideration in the other play sessions. In some implementations, crediting the ATM card, the credit card, the one or more bank accounts, the one or more cryptocurrency exchange accounts, and/or the one or more balance accounts may cause the identifiers to be associated with such transactions. For example, the identifiers may be included as notes and/or receipts associated with the transactions.

By way of non-limiting example, outputting the first identifier may include printing the first identifier and the representation of the first output consideration balance on a physical item such as a first paper ticket. As another example, outputting the second identifier may include uploading the second identifier and the representation of the second output consideration balance to an RFID on a play card. In some implementations, the individual session risk scores may be determined upon determination and output of the individual identifiers that signify conclusion of the individual play sessions. By way of non-limiting example, the second session risk score may be determined upon determination and output of the second identifier.

In some implementations, output component 118 may be configured to store the parameter values for (i) the consideration input parameters, (ii) the play parameters, and (iii) the consideration extraction parameters to electronic storage 126 responsive to the termination of the individual play sessions, e.g., the first play session and the second play session. In some implementations, given that server(s) 102 and gaming machines 122 may communicate via network 140, information obtaining component 108 may be configured to determine the parameter values for the individual play sessions on gaming machines 122, and subsequently store such in electronic storage 126. Thus, for example, the parameter values for the first play session and the parameter values for the second play sessions, and/or other play sessions are stored to electronic storage 126.

In some implementations, value determining component 116 may be connected to image capture device(s) 150. Image capture devices 150 may capture images, video, and/or audio signals of the users using gaming machines 122 and/or the users near gaming machines 122. Image capture devices 150 may be connected and positioned on gaming machines 122 in a manner so that image capture devices 150 may capture images, videos, and/or audio signals of the users using gaming machines 122 and/or the users near gaming machines 122. Individual gaming machines 122 may include one or more of image capture devices 150. In some implementations, the capture may be continuous. In some implementations, the capture may be upon the users initiating the play sessions. In some implementations, the capture may be upon motion detection and/or audio detection.

The images and/or videos captured may capture and convey facial features, body types, clothing worn, accessories worn, physical mannerisms, and/or other visual information. The audio signals may convey audio information representing utterances spoken or sounds provided by the users using or near gaming machines 122. The utterances and sounds may include voice tones, inflections, frequency used jargon, accents, auditory habits (e.g., coughs, throat clearing), utterances in multiple languages, and/or other utterances and sounds. Based on the captured images, videos, and/or audio signals, the value determining component 116 may be configured to analyze or employ the models described herein to detect user patterns that are indicative of participation in the money laundering. The user gaming patterns that may be indicative of the of participation in the money laundering may include, but are not limited to, the same users given their physical visual features and/or auditory features using gaming machines 122, the same users using the same gaming machines 122, the same gaming machines 122 being used by a particular set of users, the same users using gaming machines 122 at particular times (e.g., a day of the week, time of day, time of month, month of a year), and/or other user gaming patterns. The user gaming patterns may be stored to electronic storage 126 by value determining component 116.

In some implementations, the captured images, videos, and/or audio signals may be transmitted to server(s) 102 for its instruction components to perform such analysis or employ the models. In some implementations, the captured images, videos, and/or audio signals may be transmitted to external analysis resources to detect the user gaming patterns. In some implementations, determining the preliminary risk scores and/or the session risk scores may be based on the user gaming patterns.

Figure 3A:
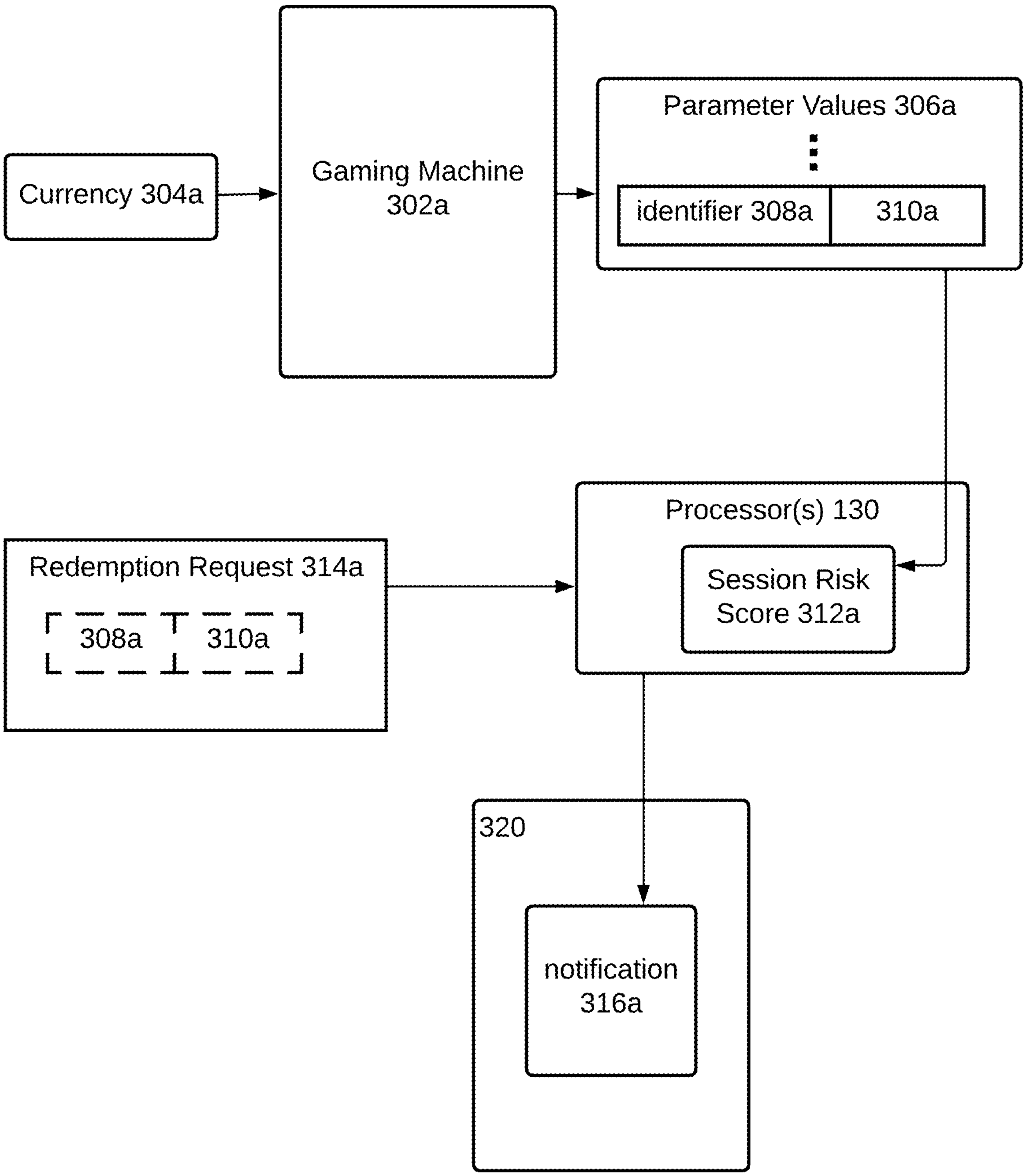
FIG. 3A-B illustrates an example implementation of the system configured to monitor potential money laundering activity through regulating gaming machines, in accordance with one or more implementations.

FIG. 3A illustrates a gaming machine 302*a*. Currency 304 may be input into gaming machine 302*a* to initiate a play session. Upon initiation and completion of the play session where one or more game events may be played, parameter values 306*a* for (i) consideration input parameters, (ii) play parameters, and (iii) consideration extraction parameters may be determined. Parameter values 306*a* for the consideration extraction parameters may include an identifier 308*a* and consideration output balance 310*a*. Based on parameter values 306*a*, processor(s) 130 (the same in FIG. 1A) may determine session risk score 312*a* which quantifies a likelihood that redemption of consideration output balance 310*a* without subsequent gaming on gaming machine 302*a* or other gaming machine using consideration output balance 310*a* is money laundering. A redemption request 314*a*, that includes identifier 308*a* and consideration output balance 310*a*, may be received by processor(s) 130. Responsive to redemption requestion 314*a*, presence of identifier 308*a* via redemption request 314*a*, and responsive to session risk score 312*a* breaching a threshold likelihood, a notification 316*a* may be presented to an electronic device 320 indicating that the play session may be money laundering.

Figure 3B:
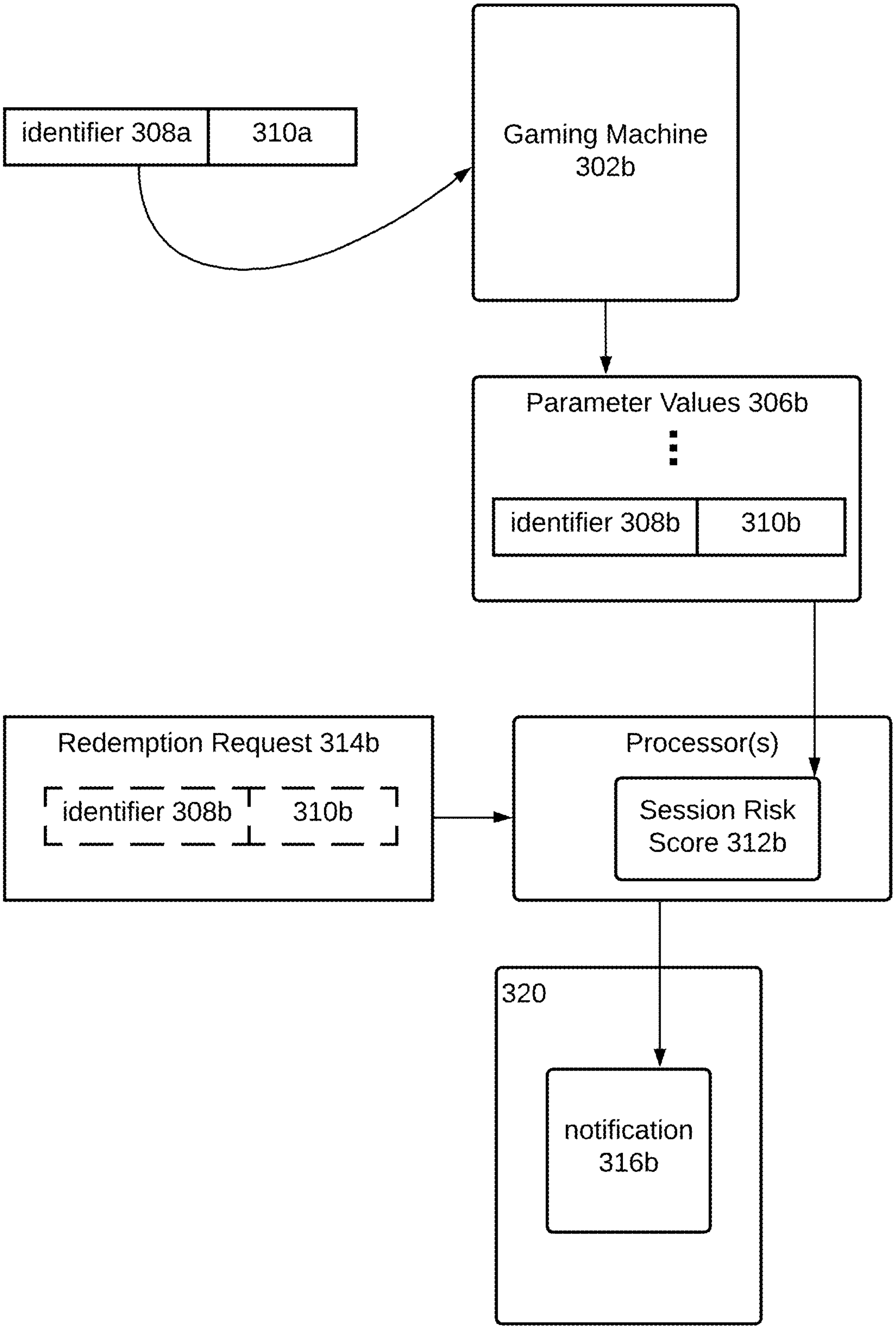

FIG. 3B illustrates a gaming machine 302*b*. Identifier 308*a* may be input to gaming machine 302*b* so that consideration output balance 310*a* may be used as consideration during a second play session on gaming machine 302*b*.

Upon initiation and completion of the second play session where one or more game events may be played via gaming machines 302*b*, parameter values 306*b* for (i) consideration input parameters, (ii) play parameters, and (iii) consideration extraction parameters may be determined. Parameter values 306*b* for the consideration extraction parameters may include an identifier 308*b* and consideration output balance 310*b*. Based on parameter values 306*b*, processor(s) 130 may determine session risk score 312*b* which quantifies a likelihood that redemption of consideration output balance 310*b* without subsequent gaming on gaming machine 302*a* (of FIG. 3A), 302*b*, or other gaming machine using consideration output balance 310*b* is money laundering. A redemption request 314*b*, that includes identifier 308*b* and consideration output balance 310*b*, may be received by processor(s) 130. Responsive to redemption requestion 314*b*, presence of identifier 308*b* via redemption request 314*b*, and responsive to session risk score 312*b* breaching a threshold likelihood, a notification 316*b* may be presented to electronic device 320 indicating that the play session may be money laundering.

Referring back to FIG. 1 in some implementations, server(s) 102, client computing platform(s) 104, and/or external resources 124 may be operatively linked via one or more electronic communication links. For example, such electronic communication links may be established, at least in part, via network 140 such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s)

102 may include communication lines, or ports to enable the exchange of information with network 140 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, 116, 118, and/or 120, and/or other components. Processor(s) 128 may be configured to execute components 108, 110, 112, 114, 116, 118, and/or 120, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and/or 120 are illustrated in FIG. 1 as being implemented within a single processing unit, in implementations in which processor(s) 128 includes multiple processing units, one or more of components 108, 110, 112, 114, 116, 118, and/or 120 may be implemented remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, and/or 120. As another example, processor(s) 128 may be configured to execute one or more additional components that may perform some or all of the functionality attributed below to one of components 108, 110, 112, 114, 116, 118, and/or 120.

Figure 2:
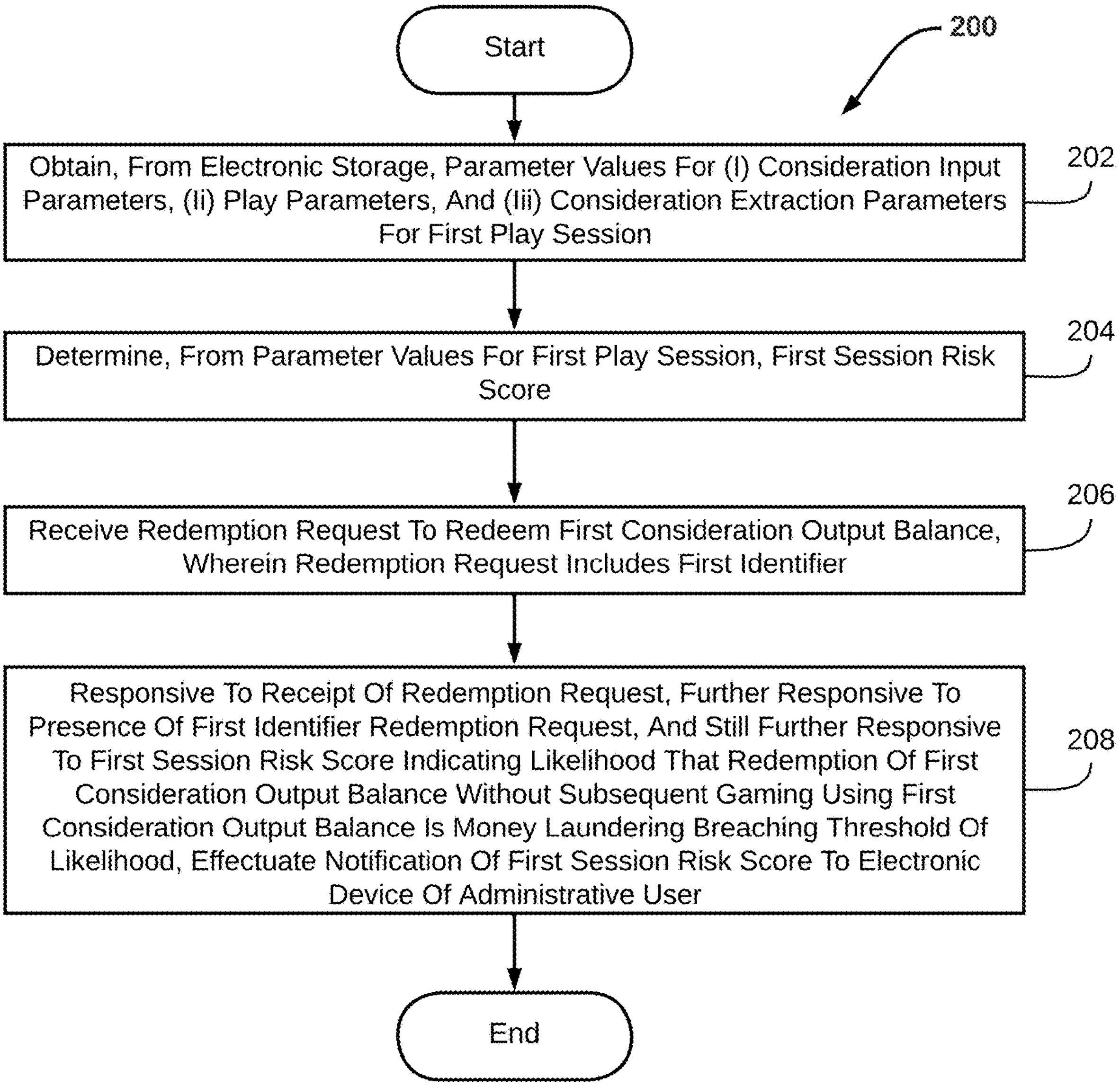
FIG. 2 illustrates a method to monitor potential money laundering activity through regulating gaming machines, in accordance with one or more implementations.

FIG. 2 illustrates a method 200 to monitor potential money laundering activity through regulating gaming machines, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining, from electronic storage, parameter values for (i) consideration input parameters, (ii) play parameters, and (iii) consideration extraction parameters for a first play session. The consideration extraction parameters for the first play session may include a first consideration output balance, and a first identifier. Operation 202 may be performed by one or more hardware processors configured by machine-readable instructions including a component that is the same as or similar to information obtaining component 108, in accordance with one or more implementations.

An operation 204 may include determining, from the parameter values for the first play session, a first session risk score which quantifies a likelihood that redemption of the first consideration output balance without subsequent gaming using the first consideration output balance is money laundering. Operation 204 may be performed by one or more hardware processors configured by machine-readable instructions including a component that is the same as or similar to score determining component 110, in accordance with one or more implementations.

An operation 206 may include receiving a redemption request to redeem the first consideration output balance. The redemption request may include the first identifier. Operation 206 may be performed by one or more hardware processors configured by machine-readable instructions including a component that is the same as or similar to redemption receiving component 112, in accordance with one or more implementations.

An operation 208 may include effectuating a notification of the first session risk score to an electronic device of an administrative user. The effectuation may be responsive to receipt of the redemption request, further responsive to the presence of the first identifier redemption request, and still further responsive to the first session risk score indicating the likelihood that redemption of the first consideration output balance without subsequent gaming using the first consideration output balance is money laundering breaching a threshold of likelihood. Operation 208 may be performed by one or more hardware processors configured by machine-readable instructions including a component that is the same as or similar to notifying component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to monitor potential money laundering activity through regulating gaming machines, the system comprising:

electronic storage that stores, for individual play sessions on gaming machines of a set of gaming machines including at least a first gaming machine and a second gaming machine, parameter values for (i) consideration input parameters, (ii) play parameters, and (iii) consideration extraction parameters, wherein the consideration input parameters for a given play session include consideration amount input during the given play session, and currency denominations input as consideration during the given play session, the play parameters for the given play session include one or more of a number of game events played during the given play session, an amount of times consideration is added during the given play session, an amount of consideration wagered for individual ones of the game events during the given play session, a total amount of consideration wagered over the individual play sessions, a comparison or proportion of a total amount of consideration wagered with a total amount of consideration input during the given play session, an amount of time between the game events during the given play session, and/or a duration of the given play session, the consideration extraction parameters for the given play session include a consideration output balance obtained by a user subsequent to the given play session and an identifier, and wherein the play sessions include a first play session; and one or more processors configured by machine-readable instructions to:

obtain, from the electronic storage, the parameter values for (i) the consideration input parameters, (ii) the play parameters, and (iii) the consideration extraction parameters for the first play session, wherein the consideration extraction parameters for the first play session include a first consideration output balance, and a first identifier;

determine, from the parameter values for the first play session, a first session risk score which quantifies a likelihood that redemption of the first consideration output balance without subsequent gaming on the gaming machines of the set of gaming machines using the first consideration output balance is money laundering;

receive a redemption request to redeem the first consideration output balance, wherein the redemption request includes the first identifier; and responsive to receipt of the redemption request, further responsive to the presence of the first identifier redemption request, and still further responsive to the first session risk score indicating the likelihood that redemption of the first consideration output balance without subsequent gaming on the gaming machines of the set of gaming machines using the first consideration output balance is money laundering breaching a threshold of likelihood, effectuate a notification of the first session risk score to an electronic device of an administrative user.

2. The system of claim 1, further comprising the first gaming machine, and wherein the first gaming machine includes a second set of one or more processors configured by a second set of machine-readable instructions to:

determine the parameter values for the consideration input parameters upon the first gaming machine receiving at least a first piece of currency;

determine the parameter values for the play parameters upon execution of the one or more game events on the first gaming machine during the first play session;

determine the parameter values for the consideration extraction parameters upon the first gaming machine receiving an indication to terminate the first play session;

output the first identifier and a representation of the first output consideration balance in response to receiving the indication to terminate the first play session; and store the parameter values for (i) the consideration input parameters, (ii) the play parameters, and (iii) the consideration extraction parameters to the electronic storage responsive to the termination of the first play session.

3. The system of claim 2, wherein outputting the first identifier includes printing the first identifier and the representation of the first output consideration balance on a physical item.

4. The system of claim 2, wherein the second set of the one or more processors are further configured by the second set of the machine-readable instructions to:

determine, from the parameter values for the first play session, a first preliminary risk score which quantifies a likelihood that the first play session is participating in the money laundering in response to receiving the indication to terminate the first play session; and effectuate a preliminary notification of the first preliminary risk score to the electronic device of the administrative user.

5. The system of claim 4, wherein the determination of the first session risk score is based on the first preliminary risk score.

6. The system of claim 1, wherein the play sessions include a second play session on the second gaming machine, and wherein the one or more processors are further configured by machine-readable instructions to:

obtain, from the electronic storage, the parameter values for (i) the consideration input parameters, (ii) the play parameters, and (iii) the consideration extraction parameters for the second play session, wherein a second consideration item input for the second play session includes the first identifier such that the first consideration output balance is used as the consideration during the second play session, wherein the consideration extraction parameters for the second play session include a second consideration output balance, and a second identifier;

determine, from the parameter values for the second play session, a second session risk score which quantifies a likelihood that redemption of the second consideration output balance without subsequent gaming on the gaming machines of the set of gaming machines using the second consideration output balance is money laundering;

receive a redemption request to redeem the second consideration output balance, wherein the redemption request includes the second identifier; and responsive to receipt of the redemption request, further responsive to the presence of the second identifier redemption request, and still further responsive to the second session risk score indicating the likelihood that redemption of the second consideration output balance without subsequent gaming on the gaming machines of the set of gaming machines using the second consideration output balance is money laundering breaching a threshold of likelihood, effectuate a notification of the second session risk score to an electronic device of an administrative user.

7. The system of claim 6, wherein the determination of the second session risk score is further based on the parameter values for the first play session by virtue of the first identifier being included as the second consideration item input.

8. The system of claim 7, wherein the one or more processors are further configured by the machine-readable instructions to:

determine, based on the parameter values for the first play session, a first preliminary risk score which quantifies a likelihood that the first play session is participating in the money laundering in response to the first gaming machine receiving the indication to terminate the first play session; and determine a second preliminary risk score for the second play session based on the parameter values for the second play session and the first preliminary risk score in response to the second gaming machine receiving the indication to terminate the second play session, wherein the second preliminary risk score quantifies a likelihood that the second play session is participating in the money laundering, wherein determining the second session risk score is based on the first preliminary risk score and the second preliminary risk score.

9. The system of claim 6, wherein the second session risk score is determined upon determination of the second identifier.

10. The system of claim 8, wherein preliminary risk scores are determined by the gaming machines that execute the play sessions, such that the first preliminary risk score is determined by the first gaming machine, and such that the second preliminary risk score is determined by the second gaming machine.

11. A method to monitor potential money laundering activity through regulating gaming machines, the method comprising:

obtaining, from electronic storage, parameter values for (i) consideration input parameters, (ii) play parameters, and (iii) consideration extraction parameters for a first play session, wherein the electronic storage stores, for individual play sessions on gaming machines of a set of gaming machines including at least a first gaming machine and a second gaming machine, the parameter values for (i) the consideration input parameters, (ii) the play parameters, and (iii) the consideration extraction parameters, wherein the play sessions include the first play session wherein the consideration input parameters for a given play session include consideration amount input during the given play session, and currency denominations input as consideration during the given play session, the play parameters for the given play session include one or more of a number of game events played during the given play session, an amount of times consideration is added during the given play session, an amount of consideration wagered for individual ones of the game events during the given play session, a total amount of consideration wagered over the individual play sessions, a comparison or proportion of a total amount of consideration wagered with a total amount of consideration input during the given play session, an amount of time between the game events during the given play session, and/or a duration of the given play session, the consideration extraction parameters for the given play session include a consideration output balance obtained by a user subsequent to the given play session and an identifier, wherein the consideration extraction parameters for the first play session include a first consideration output balance, and a first identifier;

determining, from the parameter values for the first play session, a first session risk score which quantifies a likelihood that redemption of the first consideration output balance without subsequent gaming on the gaming machines of the set of gaming machines using the first consideration output balance is money laundering;

receiving a redemption request to redeem the first consideration output balance, wherein the redemption request includes the first identifier; and responsive to receipt of the redemption request, further responsive to the presence of the first identifier redemption request, and still further responsive to the first session risk score indicating the likelihood that redemption of the first consideration output balance without subsequent gaming on the gaming machines of the set of gaming machines using the first consideration output balance is money laundering breaching a threshold of likelihood, effectuating a notification of the first session risk score to an electronic device of an administrative user.

12. The method of claim 11, further comprising:

determining, by the first gaming machine, the parameter values for the consideration input parameters upon the first gaming machine receiving at least a first piece of currency;

determining, by the first gaming machine, the parameter values for the play parameters upon execution of the one or more game events on the first gaming machine during the first play session;

determining, by the first gaming machine, the parameter values for the consideration extraction parameters upon the first gaming machine receiving an indication to terminate the first play session;

outputting, by the first gaming machine, the first identifier and a representation of the first output consideration balance in response to receiving the indication to terminate the first play session; and storing, by the first gaming machine, the parameter values for (i) the consideration input parameters, (ii) the play parameters, and (iii) the consideration extraction parameters to the electronic storage responsive to the termination of the first play session.

13. The method of claim 12, wherein outputting the first identifier includes printing the first identifier and the representation of the first output consideration balance on a physical item.

14. The method of claim 12, further comprising:

determining, by the first gaming machine, from the parameter values for the first play session, a first preliminary risk score which quantifies a likelihood that the first play session is participating in the money laundering in response to receiving the indication to terminate the first play session; and effectuating, by the first gaming machine, a preliminary notification of the first preliminary risk score to the electronic device of the administrative user.

15. The method of claim 14, wherein the determination of the first session risk score is based on the first preliminary risk score.

16. The method of claim 11, the method further comprising:

obtaining, from electronic storage, parameter values for (i) the consideration input parameters, (ii) the play parameters, and (iii) the consideration extraction parameters for a second play session;

determining, from the parameter values for the second play session, a second session risk score which quantifies a likelihood that redemption of the second consideration output balance without subsequent gaming on the gaming machines of the set of gaming machines using the second consideration output balance is money laundering;

receiving a redemption request to redeem the second consideration output balance, wherein the redemption request includes the second identifier; and responsive to receipt of the redemption request, further responsive to the presence of the second identifier redemption request, and still further responsive to the second session risk score indicating the likelihood that redemption of the second consideration output balance without subsequent gaming on the gaming machines of the set of gaming machines using the second consideration output balance is money laundering breaching a threshold of likelihood, effectuating a notification of the second session risk score to an electronic device of an administrative user.

17. The method of claim 16, wherein the determination of the second session risk score is further based on the parameter values for the first play session by virtue of the first identifier being included as the second consideration item input.

18. The method of claim 17, further comprising:

determining, based on the parameter values for the first play session, a first preliminary risk score which quantifies a likelihood that the first play session is participating in the money laundering in response to the first gaming machine receiving the indication to terminate the first play session; and determining a second preliminary risk score for the second play session based on the parameter values for the second play session and the first preliminary risk score in response to the second gaming machine receiving the indication to terminate the second play session, wherein the second preliminary risk score quantifies a likelihood that the second play session is participating in the money laundering, wherein determining the second session risk score is based on the first preliminary risk score and the second preliminary risk score.

19. The method of claim 16, wherein the second session risk score is determined upon determination of the second identifier.

20. The method of claim 18, wherein preliminary risk scores are determined by the gaming machines that execute the play sessions, such that the first preliminary risk score is determined by the first gaming machine, and such that the second preliminary risk score is determined by the second gaming machine.

* * * * *